United States Patent
Monajemi et al.

(10) Patent No.: US 10,849,143 B2
(45) Date of Patent: Nov. 24, 2020

(54) MACHINE LEARNING (ML) BASED CLIENT BEHAVIOR PREDICTION FOR MULTI-USER (MU) SCHEDULER OPTIMIZATION

(71) Applicant: Cisco Technology, Inc., San Jose, CA (US)

(72) Inventors: Pooya Monajemi, San Francisco, CA (US); Gautam Dilip Bhanage, Milpitas, CA (US); Benjamin Jacob Cizdziel, San Jose, CA (US); Khashayar Mirfakhraei, Los Altos, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/299,487

(22) Filed: Mar. 12, 2019

(65) Prior Publication Data

US 2020/0296739 A1    Sep. 17, 2020

(51) Int. Cl.
*H04W 72/12*    (2009.01)
*H04W 24/10*    (2009.01)
*H04W 24/02*    (2009.01)

(52) U.S. Cl.
CPC ....... *H04W 72/1247* (2013.01); *H04W 24/02* (2013.01); *H04W 24/10* (2013.01); *H04W 72/121* (2013.01)

(58) Field of Classification Search
CPC . H04W 72/1247; H04W 24/10; H04W 24/02; H04W 72/121
See application file for complete search history.

(56) References Cited

U.S. PATENT DOCUMENTS

| 8,111,662 B2 | 2/2012 | Lee et al. |
| 8,842,606 B2 | 9/2014 | Denteneer et al. |
| 2017/0142017 A1* | 5/2017 | Davis ................. H04L 43/0882 |
| 2018/0020428 A1* | 1/2018 | Madhavan ........ H04W 72/0446 |

FOREIGN PATENT DOCUMENTS

| CN | 103095350 | 5/2013 |

OTHER PUBLICATIONS

Coronado et al. "An Adaptive Medium Access Parameter Prediction Scheme for IEEE 802.11 Real-Time Applications", Jan. 16, 2017.*

(Continued)

*Primary Examiner* — Jae Y Lee
(74) *Attorney, Agent, or Firm* — Meunier Carlin & Curfman LLC

(57) ABSTRACT

In one embodiment, an apparatus comprises an enhanced distributed channel access (EDCA) selection agent configured to receive a plurality of measurements pertaining to a plurality of clients, compute a set of optimal EDCA parameters using the plurality of measurements, and provide an EDCA configuration for the plurality of clients, and a client behavior predictor configured to receive the plurality of measurements pertaining to the plurality of clients, to receive the set of optimal EDCA parameters, and to compute a plurality of client mode predictions. Client mode predictions may be evaluated and potentially used for additional EDCA parameter optimization by the EDCA selection agent.

17 Claims, 6 Drawing Sheets

(56) References Cited

OTHER PUBLICATIONS

Coronado, E., et al., "An Adaptive Medium Access Parameter Prediction Scheme for IEEE 802.11 Real-Time Applications," Wireless Communications and Mobile Computing, Article ID 5719594, 2017, 19 pages.
Serrano, P., et al., "Optimal Configuration of 802.11e EDCA for Real-Time and Data Traffic," IEEE Transactions on Vehicular Technology, vol. 59, No. 5, 2010, pp. 2511-2528.
Wanalertlak, W., et al., "Behavior-based mobility prediction for seamless handoffs in mobile wireless networks," Wireless Networks, vol. 17, Issue 3, 2011, pp. 645-658.
Manweiler, J., et al., "Predicting Length of Stay at WiFi Hotspots," Proceedings—IEEE INFOCOM, 2013, 9 pages.
Xu, G., et al., "A user behavior prediction model based on parallel neural network and k-nearest neighbor algorithms," Cluster Computing, vol. 20, Issue 2, 2017, pp. 1703-1715.

\* cited by examiner

MACHINE LEARNING (ML) BASED CLIENT BEHAVIOR PREDICTION FOR MULTI-USER (MU) SCHEDULER OPTIMIZATION

BACKGROUND

The present disclosure relates generally to wireless networks and communication systems.

BACKGROUND

IEEE 802.11ax, also known as High-Efficiency Wireless (HEW), is a Wireless Local Area Network standard in the IEEE 802.11 set of specifications, and implements mechanisms to serve a consistent and reliable stream of data to more users in the presence of many other users. 802.11ax utilizes multi-user (MU) technologies, and includes features such as, for example, downlink and uplink multi-user (UL-MU) operation by means of orthogonal frequency division multiple access (OFDMA) and multi-user multiple input multiple output (MU-MIMO) technologies.

Enhanced Distributed Channel Access (EDCA) parameters are a set of parameters announced by an access point (AP) to the clients that determine the level of clients' aggressiveness in contending for channel access. Notable EDCA parameters include AIFS (arbitration inter-frame spacing), cwMin (minimum contention window), and cwMax (maximum contention window). While these parameters have been in effect since the earliest days of 802.11, 802.11ax introduced a new paradigm in channel access. In 802.11ax the AP may schedule uplink transmissions to its clients (in either UL-MU-OFDMA (uplink multi-user orthogonal frequency division multiple access) mode or UL-MU-MIMO (uplink multi-user multiple input multiple output) mode) by sending trigger frames that indicate which client uses which set of resources to transmit. In exchange for this scheduled service by AP, clients that sign up for UL-MU triggers must then contend less aggressively on their own for medium access. This lowered level of aggressiveness is announced by the AP through a second set of EDCA parameters that are called the MU-EDCA parameters. In essence, MU-EDCA are the parameters used for individual contention when a client has signed up for MU service.

Conventionally, EDCA parameters have been statically configured by user input. However, given the complexity of 11ax MAC a static set of values is not adequate to maximize performance in high-density or highly dynamic scenarios. Configuring EDCA parameters in 802.11ax has become more complex because of the configuration of EDCA and MU-EDCA parameters in the presence of both UL-MU and UL-SU (single user) traffic as well as legacy traffic, and because of clients' opt-out behavior, for example.

BRIEF DESCRIPTION OF THE DRAWINGS

The following detailed description of illustrative embodiments is better understood when read in conjunction with the appended drawings. For the purpose of illustrating the embodiments, there is shown in the drawings example constructions of the embodiments; however, the embodiments are not limited to the specific methods and instrumentalities disclosed. In the drawings.

DESCRIPTION OF EXAMPLE EMBODIMENTS

Overview

Figure 1:
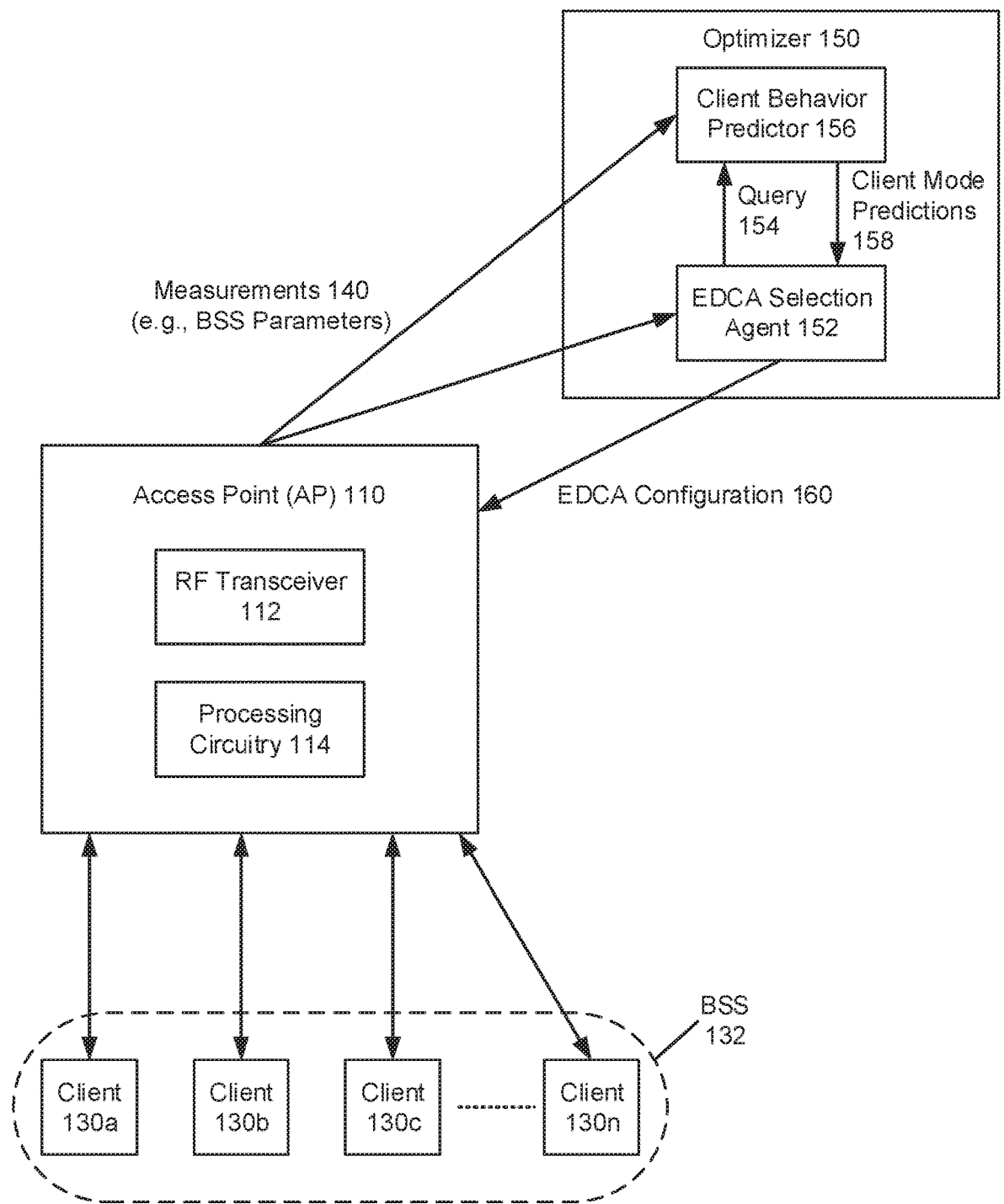
FIG. 1 is an illustration of an exemplary environment for machine learning (ML) based client behavior prediction for multi-user (MU) scheduler optimization.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In an implementation, an apparatus is provided that may include an enhanced distributed channel access (EDCA) selection agent configured to receive a plurality of measurements pertaining to a plurality of clients, compute a set of optimal EDCA parameters using the plurality of measurements, and provide an EDCA configuration for the plurality of clients, and a client behavior predictor configured to receive the plurality of measurements pertaining to the plurality of clients, to receive the set of optimal EDCA parameters, and to compute a plurality of client mode predictions. Client mode predictions may be evaluated and potentially used for additional EDCA parameter optimization by the EDCA selection agent.

In an implementation, a method is provided that may include obtaining a plurality of measurements from a plurality of clients on a network, computing a set of optimal EDCA parameters using the plurality of measurements, computing a plurality of client mode predictions associated with the plurality of clients using the plurality of measurements and the set of optimal EDCA parameters, determining whether the plurality of client mode predictions is satisfactory, and deploying the set of optimal EDCA parameters to the plurality of clients when the plurality of client mode predictions is satisfactory.

In an implementation, a method is provided that may include deploying a set of EDCA parameters to a plurality of clients on a network, receiving client transition data pertaining to mode transitions of each of the plurality of clients, and providing the client transition data to a client behavior predictor.

EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

FIG. 1 is an illustration of an exemplary environment 100 for machine learning (ML) based client behavior prediction for multi-user (MU) scheduler optimization. In the environment 100, which may be a local area network under 802.11, clients 130a, 130b, 130c, . . . 130n wirelessly communicate. A basic service set (BSS) 132 comprises the clients 130a, 130b, 130c, . . . 130n that remain within a certain coverage area and form some sort of association and is identified by the SSID of the BSS. In an implementation, the clients 130a, 130b, 130c, . . . 130n are associated with a central station, referred to as an access point (AP) 110, that manages the BSS. In some implementations, the AP 110 may be connected to and/or managed by a controller that is a separate entity. An optimizer 150, described further herein, is also provided. The optimizer may reside within the AP and/or within the controller, or elsewhere.

The clients 130a, 130b, 130c, . . . 130n, the AP 110, and the optimizer 150 are operably connected to one or more networks, such as a LAN (local area network), a WAN (wide area network), etc. Any number of clients may be deployed and associated with the AP 110. Although only four clients 130 are shown, and only one AP 110 is shown, this is not intended to be limiting, and any number of clients and access points may be used depending on the implementation.

Figure 6:
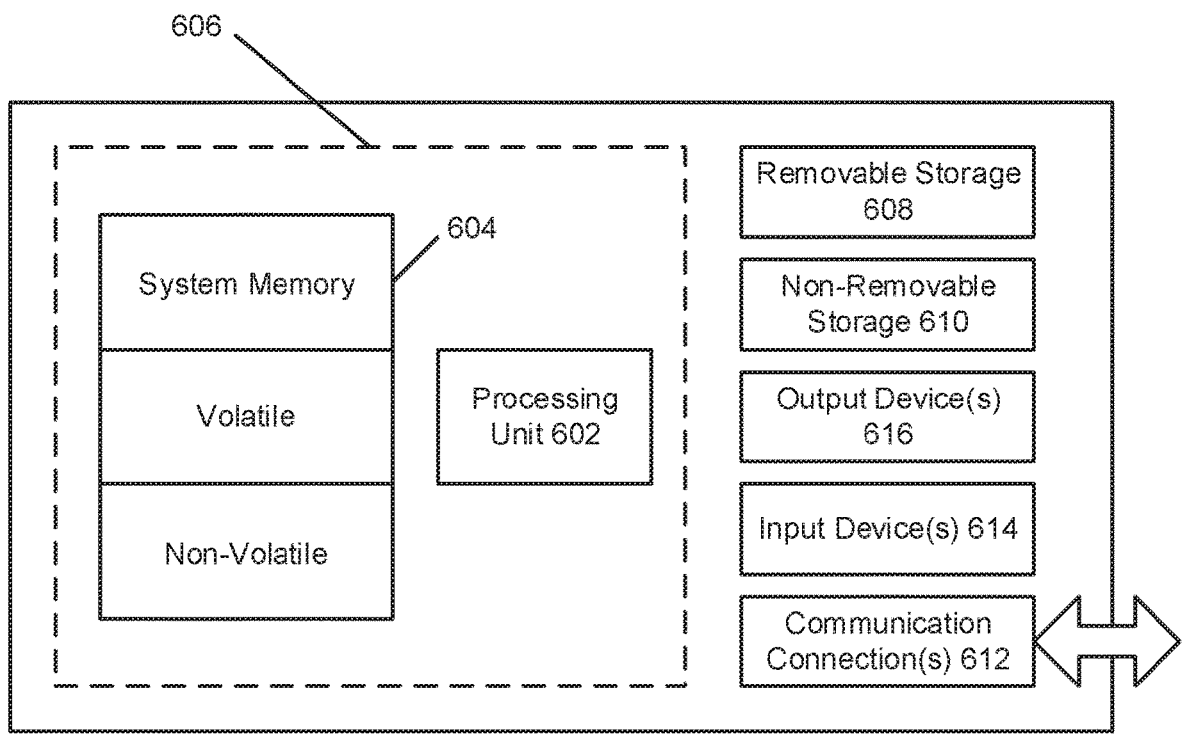
FIG. 6 shows an exemplary computing environment in which example embodiments and aspects may be implemented.

Each of the clients 130a, 130b, 130c, . . . 130n, as well as the AP 110, may be any type of device with functionality for connecting to a WiFi network such as a computer, smart phone, or a UE (user equipment) with WLAN access capability, such as terminals in a LTE (Long Term Evolution) network. Depending on the implementation, the AP 110 may comprise any type of access point including a router, for example. Each of the clients 130 may comprise any type of wireless station or receiver device for example. The AP 110 and the clients 130 may be implemented using a variety of computing devices such as smartphones, desktop computers, laptop computers, tablets, set top boxes, vehicle navigation systems, and video game consoles. Other types of computing devices may be supported. A suitable computing device for use as a client or as an AP is illustrated in FIG. 6 as the computing device 600. The example embodiments described herein refer to the Institute of Electrical and Electronics Engineers (IEEE) 802.11 standards; however, these examples are provided in order to employ well defined terminology for ease of description, and the principles described herein may be applied to any suitable protocol that provides traffic such as multicast streams as described herein.

The AP 110 comprises an RF (radio frequency) transceiver 112 and processing circuitry 114 that includes the functionalities for WiFi network access via the RF transceiver as well as other functionalities for processing described herein. Each of the client devices also includes an RF transceiver and processing circuitry. The RF transceivers may each incorporate one or more antennas.

Figure 2:
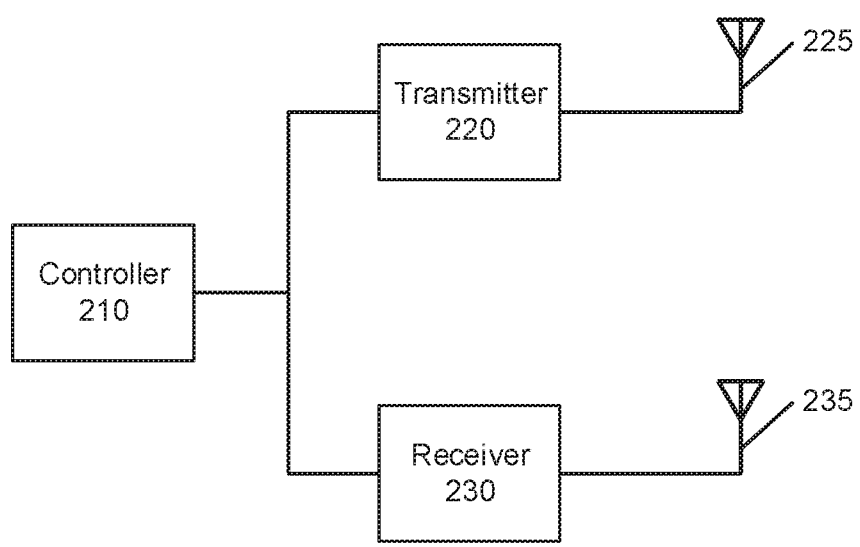
FIG. 2 is a block diagram illustrating an example of a networked device operable in accordance with an example embodiment.

More particularly, FIG. 2 is a block diagram illustrating an example of a networked device 200, such as an access point, operable in accordance with an example embodiment. The networked device 200 is suitable to provide the functionality described herein for the AP 110, for example. The networked device 200 comprises a transmitter 220 for sending data, a receiver 230 for receiving data, and a controller 210 coupled with the transmitter 220 and the receiver 230 and operable to send and receive data via the transmitter 220 and the receiver 230, respectively. In FIG. 2, the transmitter 220 is coupled to an antenna 225 while the receiver 230 is coupled to an antenna 235; however, those skilled in the art can readily appreciate that the transmitter 220 and the receiver 230 can be coupled to a common antenna.

In an example embodiment, the controller 210 suitably comprises logic for performing the functionality described herein. Logic, as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), system on a chip (SoC), programmable system on a chip (PSOC), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In an 802.11 WLAN network, the clients communicate via a layered protocol that includes a physical layer (PHY), a medium access control (MAC) layer, and a logical link control (LLC) layer. The MAC layer receives data from the logical link control (LLC) layer, and delivers data to the LLC layer through the MAC service data unit (MSDU). The PHY layer receives data from the MAC and delivers data to the MAC in a PHY SDU (PSDU). The MAC layer is a set of rules that determine how to access the medium in order to send and receive data, and the details of transmission and reception are left to the PHY layer. At the MAC layer, transmissions in an 802.11 network are in the form of MAC frames of which there are three main types: data frames, control frames, and management frames. Data frames carry data from client to client. Control frames, such as request-to-send (RTS) and clear-to-send (CTS) frames, are used in conjunction with data frames deliver data reliably from client to client. Management frames are used to perform network management functions.

802.11ax introduces many MAC layer functionalities that present many possible behavior patterns for both the AP 110 and the clients 130a, 130b, 130c, . . . 130n. Predicting the clients' behavior (either individually or in a statistical manner) after a change in basic service set (BSS) operation parameters can help the AP and/or the controller in optimizing their decisions.

The 802.11ax standard provides for enhanced distributed channel access (EDCA), which supports prioritized quality of service (QoS), and provides for downlink (DL) and uplink (UL) multi-user (MU) operation. Multiple simultaneous transmissions to different clients from the AP in the DL and from multiple clients to the AP in the UL are enabled via MU-MIMO and/or orthogonal frequency division multiple access (OFDMA). With OFDMA, the AP assigns separate subsets of OFDMA subcarriers, referred to as resource units (RUs), to individual clients for UL and DL transmissions. With MU-MIMO, multiple antenna beamforming techniques are used to form spatial streams that the AP assigns to clients for UL and DL transmissions.

Thus, the 802.11ax MAC makes it possible for an AP to schedule the uplink transmissions by allocating resource units (RUs) to individual clients. While volunteering for uplink scheduling, a client can also individually contend for the medium at a lower aggressiveness level (MU-EDCA parameters announced by the AP). The client may also opt out of the AP-scheduled uplink transmissions and decide to contend solely on its own (regular EDCA parameters). Predicting the clients' choices given the APs parameters helps the AP in deciding how to change such parameters. This prediction is also difficult and inefficient to perform manually per client model and firmware level, hence an ML-based approach is described herein.

The highest efficiency in MAC is achieved by a fully scheduled operation where the central entity (e.g., the AP) allocates resources in the most optimal manner, as opposed to individual clients contending for medium access on their own. At the same time, clients may decide to opt out of UL-MU scheduling when they conclude that resources are not being allocated to them satisfactorily. Once opted-out, the client would then individually contend for the medium. Such opt out algorithms may be different based on the individual client implementations, and are functions of the client's buffer, traffic categories, scheduling resources allocated, UL MU-MIMO capability (as clients that support UL MU-MIMO are likely to be scheduled more frequently), and/or medium contention levels, for example.

With these in mind, a goal of the AP in announcing the individual EDCA parameters along with the MU-EDCA parameters is to direct as many resources as possible to be allocated to scheduled UL MU frames while still allowing urgent and legacy (11a/n/ac) traffic to pass through in SU contention mode. Examples of cases for SU traffic include cases where AP is not aware of the buffer status of the client and the client needs to send a buffer update, or the case where the initiated traffic is critical or emergency.

Returning to FIG. 1, the environment 100 further comprises an optimizer 150 that comprises an EDCA selection agent 152 and a client behavior predictor 156. Depending on the implementation, the optimizer 150 may be comprised within the AP 110 such that the optimizer may run on the AP 110. Alternatively, the optimizer 150 may run on a separate controller or other entity that provides management to the network.

The AP 110 provides measurements 140 (e.g., BSS parameters) to the EDCA selection agent 152 and to the client behavior predictor 156. As described further herein, the EDCA selection agent 152 and the client behavior predictor 156 act as a feedback loop within the optimizer 150 and converge to an optimal set of EDCA parameters for the AP 110 to deploy to the clients 130a, 130b, 130c, . . . 130n. The client behavior predictor 156 uses the measurements 140, in some implementations in response to receiving a query 154 from the EDCA selection agent 152, in determining client mode predictions 158. The EDCA selection agent 152 uses the measurements 140 and the client mode predictions 158 in determining an EDCA configuration 160 that is provided to the AP 110.

In an implementation, the AP 110 operates the BSS 132 that includes clients 130a, 130b, 130c, . . . 130n. The AP 110 announces to the BSS 132 a set of EDCA parameters (the EDCA configuration 160) that have been determined by the EDCA selection agent 152. The AP 110 also takes measurements 140 from the medium (e.g., BSS parameters) and provides them as inputs to an optimization algorithm of the EDCA selection agent 152 in the optimizer 150.

More particularly, the optimizer 150 may be used for single user (SU) and multi-user (MU) EDCA parameter optimization systems and methods, described further herein, in which the machine learning (ML) based client behavior predictor 156 forecasts whether clients 130a, 130b, 130c, . . . 130n will transition between SU and MU contention modes given a particular parameter set (e.g., the measurements 140). The prediction outcome, referred to as the client mode predictions 158, is provided to an optimization algorithm comprised within the EDCA selection agent 152 in order to fine-tune the parameters. The client behavior predictor 156 predicts whether the clients will stay in MU scheduled access mode or opt-out and contend individually. The EDCA selection agent 152 optimizes the parameters given the measurements 140 (e.g., the BSS parameters) and the client mode predictions 158 (e.g., the client contention modes), and determines the EDCA configuration 160 using the optimal parameters. The EDCA configuration 160 is then provided to the AP 110.

Thus, the EDCA selection agent 152 is involved in the SU/MU EDCA parameter decision-making. The EDCA selection agent 152 operates based on an input SU/MU state of clients along with other BSS measurements and optimizes the set of SU+MU EDCA parameters.

In some implementations, the client behavior predictor 156 comprises an ML-based algorithm, and operating on a set of BSS operation conditions and measurements as well as the announced SU/MU EDCA parameters, predicts whether the client will change its operation mode from SU to MU or vice versa. This allows the AP 110 to determine the client's past actions, and use the client behavior predictor 156 to use the information about the past behavior (i.e., the client's past actions) to predict the client's future behavior (i.e., the client's future actions).

Figure 3:
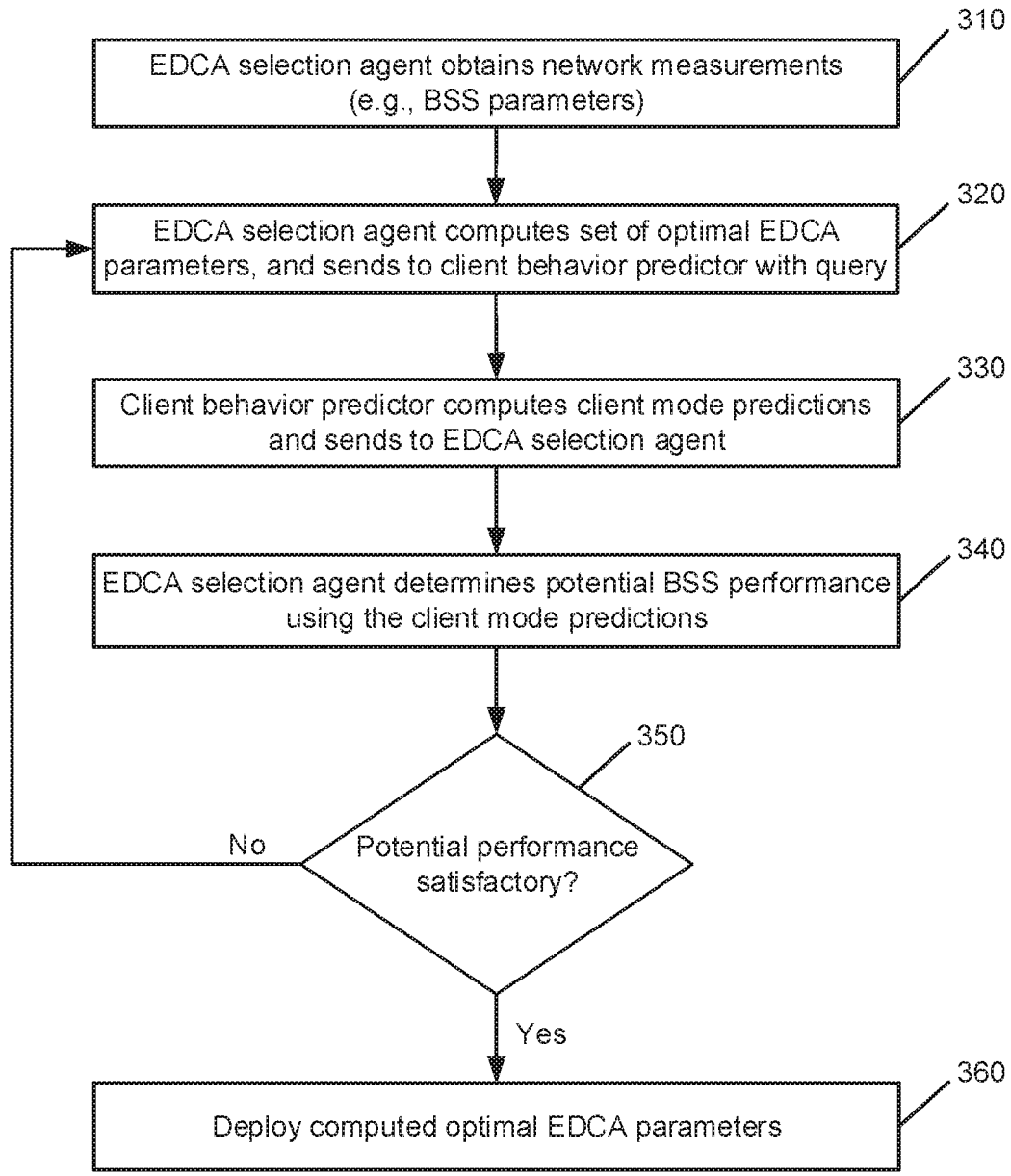
FIG. 3 is an operational flow of an implementation of a method of client behavior prediction for scheduler optimization.

FIG. 3 is an operational flow of an implementation of a method 300 of client behavior prediction for scheduler optimization. The method 300 may be implemented using aspects of the environment 100 in some implementations.

At 310, upon the occurrence of a particular trigger event or at a predetermined time (e.g., periodically at regular time intervals), the EDCA selection agent 152 obtains network measurements, such as the measurements 140, from the BSS 132.

At 320, the EDCA selection agent 152 computes a set of optimal EDCA parameters. In this manner, a potential set of optimal SU/MU EDCA parameters is determined. The set of optimal EDCA parameters is sent to the client behavior predictor 156 along with a query (e.g., the query 154) for client mode predictions 158.

At 330, the client behavior predictor 156 computes the probabilities of the client SU/MU modes and provides these probabilities as the client mode predictions 158 to the EDCA selection agent 152. The probabilities (i.e., the client mode predictions 158) are computed using the set of optimal SU/MU EDCA parameters.

At 340, the EDCA selection agent 152 determines the potential BSS 132 performance. Thus, with the knowledge of the client mode predictions 158, the EDCA selection agent 152 re-examines the BSS operation quality.

At 350, it is determined whether the potential BSS 132 performance is satisfactory. In some implementations, the potential BSS performance is determined to be satisfactory when the optimal EDCA parameters are predicted to cause at least a predetermined number or percentage of the plurality of clients to remain in MU mode (i.e., not switch from MU mode to SU mode when the optimal EDCA parameters are deployed by the AP to the clients of the BSS).

If the potential BSS 132 performance is satisfactory, then the settings (i.e., the optimal parameters from 320) are deployed at 360 by announcing the new set of parameters (i.e., the optimal parameters from 320) to the BSS 132. Thus, if the BSS operation after the predicted mode switches is satisfactory, the newly optimal set of parameters is transferred to the AP to be deployed to the clients 130a, 130b, 130c, . . . 130n of the BSS 132.

Otherwise, if the potential BSS 132 performance is not satisfactory (i.e., unsatisfactory) as determined at 350, then processing continues at 320 with the EDCA selection agent 152 computing another set of optimal EDCA parameters. Thus, for example, if a new set of parameters is expected (i.e., predicted) to cause at least a predetermined number or percentage of the clients to switch from a MU mode to a SU mode when the optimal EDCA parameters are deployed by the AP to the plurality of clients of the BSS, then such operation may have a negative impact on the BSS 132 and the parameters are not deployed by the AP 110 to the clients 130a, 130b, 130c, . . . 130n of the BSS 132.

The ML-based classifier algorithm for the client behavior predictor 156 operates independently of the implementation of the EDCA selection agent 152 and is therefore agnostic to the scheme chosen. However, in some implementations, the EDCA selection agent 152 may comprise another ML algorithm that takes the measurements 140 (e.g., the BSS parameters) and client modes as inputs and proposes EDCA parameters. This algorithm trains itself by observing the BSS performance once each set of parameters is announced.

Figure 4:
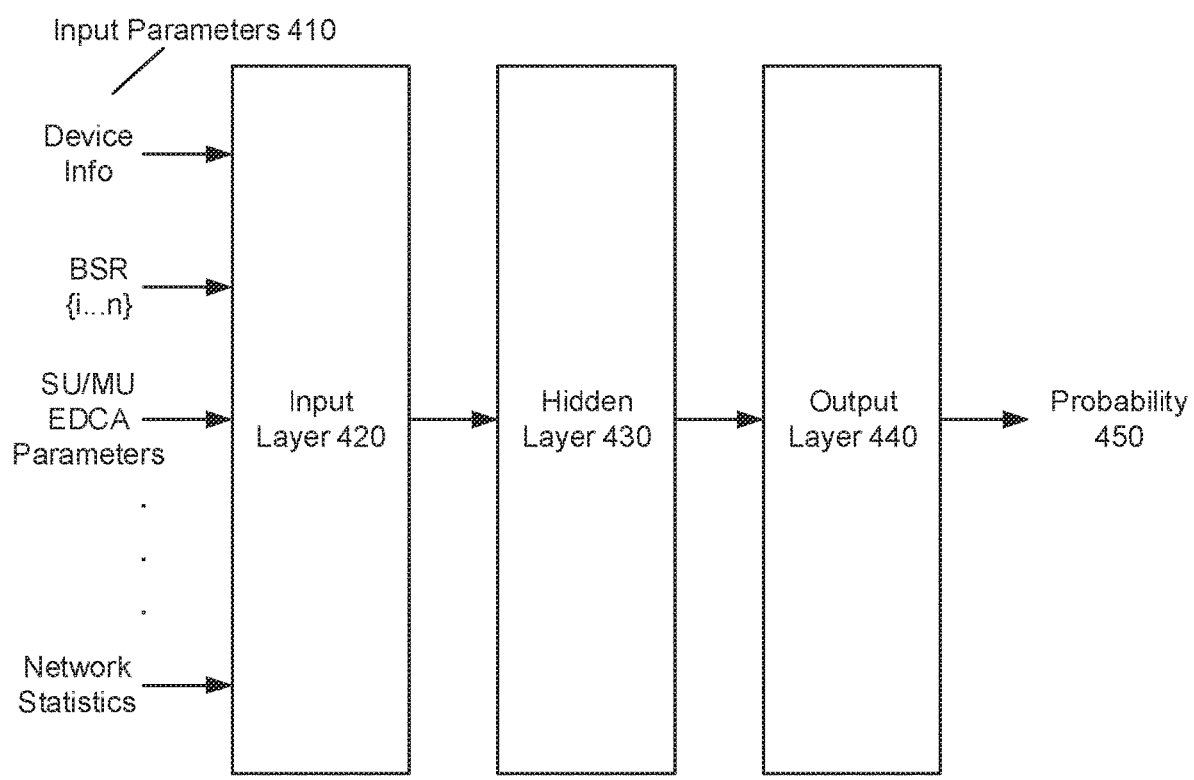
FIG. 4 is a diagram of an implementation of an artificial neural network of client behavior prediction for scheduler optimization.

FIG. 4 is a diagram of an implementation of an artificial neural network (ANN) 400 of client behavior prediction for scheduler optimization. The ANN 400 comprises an input layer 420, a hidden layer 430, and an output layer 440. The client behavior predictor 156 comprises the ANN 400 which is a type of classifier algorithm.

The input layer 420 provides input parameters 410 from the AP 110 (e.g., the measurements 140 from the BSS 132 via the AP 110) to the ANN 400. Input parameters (e.g., the measurements 140) include but are not limited to: (1) known/derived device information (manufacturer can be derived from vendor-specific IEs as well as Organizationally Unique Identifiers (OUI) from MAC addresses), and alternatively, multiple instances of classifiers may be trained; one per known device type/manufacturer; (2) medium contention level/channel utilization; (3) client's buffer status (acquired through buffer status report polls (BSRPs)), per access category; (4) client's recent scheduling history (resources allocated and frequency); (5) client RSSI (received signal strength indication); (6) EDCA parameters (current or proposed); (7) any knowledge of client's traffic patterns (e.g., TSPEC (traffic specification)); and (8) client's uplink MU-MIMO capability (capable or not capable), as UL MU-MIMO is optional while UL OFDMA is mandatory for 802.11ax. No computation is performed in the input layer 420. The input layer 420 passes the input parameters 410 to the hidden layer 430.

The hidden layer 430 has no direct connection to the AP 110 or to the BSS 132. The hidden layer 430 performs computations and transfers information (e.g., the results of the computations) to the output layer 440. Although only one hidden layer 430 is shown, any number of hidden layers may be used (or no hidden layers at all), depending on the implementation.

The output layer 440 may perform additional computations and transfers the result(s) of those computations and/or the computations performed by the hidden layer 430 to the EDCA selection agent 152 and/or the AP 110. In an implementation, the result is the probability 450. Thus, in an implementation, the output of the classifier algorithm of the client behavior predictor 156 is a single probability measure that indicates whether the associated client will participate in UL-MU scheduling or opt out given the input parameters. This probability may be comprised within the client mode predictions 158 that are generated by the client behavior predictor 156 and provided to the EDCA selection agent 152.

From the BSS performance optimization perspective, a statistically accurate outcome over the larger number of clients (e.g., the clients 130a, 130b, 130c, . . . 130n) is desirable, while correct predictions for each individual client is not vital to system performance.

Figure 5:
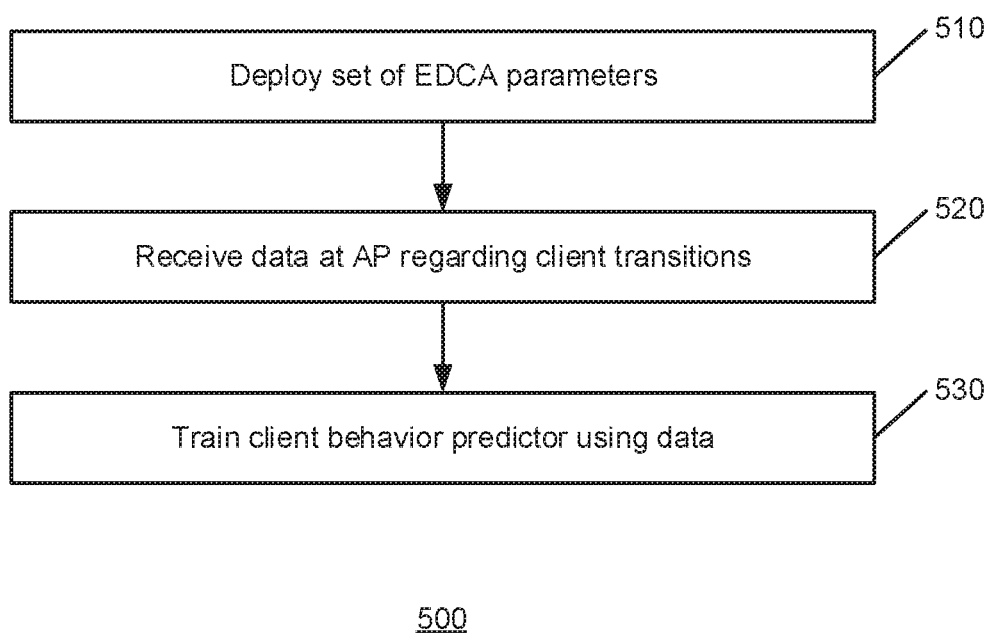
FIG. 5 is an operational flow of an implementation of a method of training a client behavior predictor for scheduler optimization.

FIG. 5 is an operational flow of an implementation of a method 500 of training a client behavior predictor for scheduler optimization. At 510, a set of EDCA parameters is deployed to the clients (e.g., similar to 360, in which the optimal set of parameters is transferred to the AP to be deployed to the clients 130a, 130b, 130c, . . . 130n).

At 520, the AP 110 monitors and receives data from, and pertaining to, each of the clients 130a, 130b, 130c, . . . 130n, regarding each client transition (e.g., data pertaining to mode transitions of each of the clients). At 530, the data regarding each client transition is provided to the client behavior predictor 156 and the data is used train the client behavior predictor 156 so that subsequent client mode predictions 158 will be more accurate or have a higher confidence level or higher probability.

In this manner, in an implementation, the client behavior predictor 156 is in a perpetual training mode (i.e., is configured to be continuously trained), whereby each observed client transition after a newly announced set of EDCA parameters is considered as training data and fed back to the system (i.e., fed back to the client behavior predictor 156 of the optimizer 150). The clients 130a, 130b, 130c, . . . 130n announce their transitions by transmitting an OMI (operating mode indicator) notification to the AP 110, and every instance of such notification received may be used to train the client behavior predictor 156.

As noted above with respect to FIG. 4 for example, an ANN may be used as the classifier and is trained by the client behavior predictor 156. Artificial neural networks provide direct estimation of the posterior probabilities while fitting the training data very well and, thus, have low bias in their classification. An ANN for a classification problem can be viewed as a mapping function, F: Rd→Rf, where d-dimensional input is submitted to the network and an f-vectored network output is obtained to make the classification decision. Given that the training is on-going with new exemplars generated during the operation of the network, the multi-layer ANN training can also provide a generalized classifier, where over-fitting the training data is not a concern. Moreover, a lean ANN classifier may be implemented without the feature extraction or spatial and/or temporal hierarchical assessment of a deep learning Convolutional Neural Networks (CNN).

However, the client behavior predictor 156 is not limited to the ANN 400. Linear or non-linear non-parametric supervised classifiers can be utilized in some implementations. Moreover, there are many other non-parametric regressive prediction methods that could be utilized like Supervised K Nearest Neighbor, or classical statistical classifiers.

In an implementation, given the above ML predictor description, the client behavior predictor 156 is instantiated once per each client in the BSS. An advantage of this approach is that the client behavior predictor 156 can be explicitly trained over each client's observed behavior. However, if this approach is deemed costly from a computational perspective, in an alternative approach, one predictor can be instantiated over the entire BSS client set whose output represents the percentage of clients predicted to remain in MU scheduled mode.

In addition to the real-time prediction, the client behavior predictor 156 may be also trained off-line in a laboratory environment or other environments (e.g. office building, stadium, etc.) where a wide range of scenarios is exposed to the clients and their behaviors observed. EDCA parameter sweeps can be applied during this off-line training to train the predictors with a wide range of EDCA parameters. The set of training parameters then is pre-loaded to the classifiers, and may be refined once in operation.

In an implantation, the classifier, as well as the EDCA parameter selection algorithm itself may be executed in a cloud environment. Alternatively, the training data may be shared between the classifiers and located on a cloud.

FIG. 6 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 6, an exemplary system for implementing aspects described herein includes a computing device, such as computing device 600. In its most basic configuration, computing device 600 typically includes at least one processing unit 602 and memory 604. Depending on the exact configuration and type of computing device, memory 604 may be volatile (such as random access memory (RAM)), non-volatile (such as read-only memory (ROM), flash memory, etc.), or some combination of the two. This most basic configuration is illustrated in FIG. 6 by dashed line 606.

Computing device 600 may have additional features/functionality. For example, computing device 600 may include additional storage (removable and/or non-removable) including, but not limited to, magnetic or optical disks or tape. Such additional storage is illustrated in FIG. 6 by removable storage 608 and non-removable storage 610.

Computing device 600 typically includes a variety of computer readable media. Computer readable media can be any available media that can be accessed by the device 600 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 604, removable storage 608, and non-removable storage 610 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 600.

Computing device 600 may contain communication connection(s) 612 that allow the device to communicate with other devices. Computing device 600 may also have input device(s) 614 such as a keyboard, mouse, pen, voice input device, touch input device, etc. Output device(s) 616 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

The present invention has been explained with reference to specific embodiments. For example, while embodiments of the present invention have been described as operating in connection with IEEE 802.11 networks, the present invention can be used in connection with any suitable wireless network environment. Other embodiments will be evident to those of ordinary skill in the art.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. An apparatus comprising:
an enhanced distributed channel access (EDCA) selection agent configured to receive a plurality of measurements pertaining to a plurality of clients, compute a set of optimal EDCA parameters using the plurality of measurements, and provide an EDCA configuration for the plurality of clients; and
a client behavior predictor configured to receive the plurality of measurements pertaining to the plurality of clients, to receive the set of optimal EDCA parameters, and to compute a plurality of client mode predictions,
wherein the plurality of clients is comprised within a basic service set (BSS), and wherein the EDCA selection agent is further configured to determine a potential BSS performance using the plurality of client mode predictions, and
wherein the potential BSS performance is determined to be unsatisfactory when the optimal EDCA parameters are predicted to cause at least a predetermined number or percentage of the plurality of clients to switch from a multi-user (MU) mode to a single user (SU) mode when the optimal EDCA parameters are deployed by an access point (AP) to the plurality of clients of the BSS.

2. The apparatus of claim 1, further comprising an optimizer that comprises the EDCA selection agent and the client behavior predictor, wherein the optimizer is comprised within an access point (AP), a controller, or an entity that provides management to a network to which the AP is connected.

3. The apparatus of claim 1, wherein the plurality of measurements comprises basic service set (BSS) parameters, and wherein the plurality of client mode predictions comprises predictions pertaining to UL (uplink) MU (multi-user) opt-in/opt-out behavior of at least one of the plurality of clients.

4. The apparatus of claim 1, wherein the EDCA selection agent is further configured to receive the plurality of client mode predictions from the client behavior predictor and compute another set of optimal EDCA parameters using the plurality of client mode predictions.

5. The apparatus of claim 1, wherein the EDCA selection agent is further configured to determine the EDCA configuration for the plurality of clients using the plurality of client mode predictions.

6. The apparatus of claim 1, wherein the EDCA selection agent is further configured to compute another set of optimal EDCA parameters when the potential BSS performance is determined to be unsatisfactory.

7. The apparatus of claim 1, wherein the client behavior predictor is configured to predict whether each of the plurality of clients will stay in a multi-user (MU) mode or opt-out into a single user (SU) mode.

8. The apparatus of claim 1, wherein at least one of the EDCA selection agent or the client behavior predictor is machine-learning (ML) based.

9. The apparatus of claim 1, wherein the client behavior predictor comprises an artificial neural network (ANN) of client behavior prediction for scheduler optimization.

10. The apparatus of claim 1, wherein the client behavior predictor is configured to be continuously trained using data pertaining to mode transitions from each of the plurality of clients.

11. A method comprising:
obtaining a plurality of measurements from a plurality of clients on a network, wherein the plurality of clients is comprised within a basic service set (BSS) and wherein the plurality of measurements comprises BSS parameters;
computing a set of optimal enhanced distributed channel access (EDCA) parameters using the plurality of measurements;
computing a plurality of client mode predictions associated with the plurality of clients using the plurality of measurements and the set of optimal EDCA parameters;
determining whether the plurality of client mode predictions is satisfactory;
deploying the set of optimal EDCA parameters to the plurality of clients when the plurality of client mode predictions is satisfactory,
determining a potential BSS performance using the plurality of client mode predictions; and
determining the potential BSS performance to be unsatisfactory when the optimal EDCA parameters are predicted to cause at least a predetermined number or percentage of the plurality of clients to switch from a multi-user (MU) mode to a single user (SU) mode when the optimal EDCA parameters are deployed by an access point to the plurality of clients of the BSS.

12. The method of claim 11, further comprising:
computing, using the plurality of measurements and the plurality of client mode predictions, another set of optimal EDCA parameters when the plurality of client mode predictions is unsatisfactory;
computing another plurality of client mode predictions associated with the plurality of clients using the plurality of measurements and the another set of optimal EDCA parameters;
determining whether the another plurality of client mode predictions is satisfactory; and
deploying the another set of optimal EDCA parameters to the plurality of clients when the another plurality of client mode predictions is satisfactory.

13. The method of claim 11, further comprising computing another set of optimal EDCA parameters when the potential BSS performance is determined to be unsatisfactory.

14. The method of claim 11, further comprising predicting whether each of the plurality of clients will stay in a multi-user (MU) mode or opt-out into a single user (SU) mode.

15. A method comprising:
deploying a set of enhanced distributed channel access (EDCA) parameters to a plurality of clients on a network, wherein the plurality of clients is comprised within a basic service set (BSS);
receiving client transition data pertaining to mode transitions of each of the plurality of clients;
providing the client transition data to a client behavior predictor;
computing a plurality of client mode predictions associated with the plurality of clients using a plurality of measurements obtained from the plurality of clients and using a set of optimal EDCA parameters computed using the plurality of measurements;
determining a potential BSS performance using the plurality of client mode predictions; and determining the potential BSS performance to be unsatisfactory when the optimal EDCA parameters are predicted to cause at least a predetermined number or percentage of the plurality of clients to switch from a multi-user (MU) mode to a single user (SU) mode when the optimal EDCA parameters are deployed by an access point to the plurality of clients of the BSS.

16. The method of claim 15, further comprising training the client behavior predictor using the client transition data.

17. The method of claim 15, further comprising:
receiving an EDCA configuration after providing the client transition data to the client behavior predictor, wherein the EDCA configuration comprises the set of optimal EDCA parameters; and
deploying the set of optimal EDCA parameters to the plurality of clients.

* * * * *